US008631390B2

(12) United States Patent  
Cox, III et al.

(10) Patent No.: US 8,631,390 B2
(45) Date of Patent: Jan. 14, 2014

(54) ARCHIVING A BUILD PRODUCT

(75) Inventors: Clark S. Cox, III, San Jose, CA (US); Maxwell O. Drukman, San Francisco, CA (US); Todd R. Fernandez, Mountain View, CA (US); Marc Verstaen, Redwood City, CA (US)

(73) Assignee: Apple Inc., Cupertinio, CA (US)

( * ) Notice: Subject to any disclaimer, the term of this patent is extended or adjusted under 35 U.S.C. 154(b) by 375 days.

(21) Appl. No.: 13/077,817

(22) Filed: Mar. 31, 2011

(65) Prior Publication Data

US 2011/0246964 A1 Oct. 6, 2011

Related U.S. Application Data

(60) Provisional application No. 61/320,680, filed on Apr. 2, 2010.

(51) Int. Cl.
*G06F 9/44* (2006.01)
(52) U.S. Cl.
USPC .......................................... 717/122; 717/120
(58) Field of Classification Search
None
See application file for complete search history.

(56) References Cited

U.S. PATENT DOCUMENTS

| | | | |
|---|---|---|---|
| 7,380,235 B1 * | 5/2008 | Fathalla | 717/109 |
| 2006/0271591 A1 * | 11/2006 | Murphy et al. | 707/103 R |
| 2008/0052677 A1 * | 2/2008 | Wolf | 717/124 |
| 2009/0249064 A1 | 10/2009 | De Atley et al. | |
| 2009/0249065 A1 | 10/2009 | De Atley et al. | |
| 2009/0249071 A1 | 10/2009 | De Atley et al. | |
| 2009/0249075 A1 | 10/2009 | De Atley et al. | |
| 2009/0300057 A1 * | 12/2009 | Friedman | 707/102 |
| 2010/0070726 A1 * | 3/2010 | Ngo et al. | 711/162 |
| 2010/0153919 A1 * | 6/2010 | Kramer et al. | 717/122 |
| 2010/0313185 A1 * | 12/2010 | Gupta et al. | 717/124 |

OTHER PUBLICATIONS

"iPhone and iPod touch Enterprise Develoyment Guide (hereafter Apple)" by Apple copyrighted 2008.*
Carruth, "Add Crash Reporting to Your Applications," Mar. 21, 2003.*
Apple Inc., "Archives Organizer Help," iOS Developer Library, Last updated May 7, 2011, 1 page, [online] [retrieved on Aug. 3, 2011] Retrieved from the internet <URL: http://developer.apple.com/library/ios/#recipes/xcode_help-archives_organizer/articles/about_archives_organizer.html#//apple_ref/doc/uid/TP40010547-CH1-SW1>.
Apple Inc., "iOS Development Guide," Last updated Nov. 15, 2010, 104 pages, [online] [retrieved on Aug. 3, 2011] Retrieved from the internet <URL: http://developer.apple.com/library/ios/Documentation/Xcode/Conceptual/iphone_development/iOS_Development_Guide.pdf>.

* cited by examiner

*Primary Examiner* — Insun Kang
(74) *Attorney, Agent, or Firm* — Womble Carlyle Sandridge & Rice LLP

(57) ABSTRACT

An enhanced integrated development environment (IDE) is able to archive a build product and/or work with an archived build product in various ways. In one embodiment, a build product archive includes a manifest, a source code snapshot, a symbol table, and a build product. The manifest contains meta-data about the archive. The source code snapshot is a copy of the source code that was used in the build process. The symbol table is a copy of the symbol table that was generated by the build process. The build product is a copy of the build product that was generated by the build process. A developer can use the enhanced IDE to help share a build product with others and/or to understand system logs and reports that describe operation of the build product (e.g., crash logs and memory logs).

20 Claims, 6 Drawing Sheets

ARCHIVING A BUILD PRODUCT

CROSS-REFERENCE TO RELATED APPLICATIONS

This application claims the benefit of U.S. Provisional Application No. 61/320,680, filed Apr. 2, 2010, which is hereby incorporated by reference herein in its entirety. This application is related to the following applications, which are hereby incorporated by reference herein in their entirety:

U.S. application Ser. No. 12/397,757, filed Mar. 4, 2009, entitled "Managing Code Entitlements for Software Developers in Secure Operating Environments" (U.S. Publication No. 2009-0249071); and U.S. application Ser. No. 12/398,001, filed Mar. 4, 2009, entitled "System and Method of Authorizing Execution of Software Code Based on at Least One Installed Profile" (U.S. Publication No. 2009-0249065).

BACKGROUND

1. Field of Art

This application generally relates to a software development environment. More particularly, it relates to archiving and retrieving a build product, e.g., a software application, and related information.

2. Description of the Related Art

During the development of a software application, many different versions and revisions of the application (each of which is referred to as a "build product") will be created. Eventually, a particular version/build product of the application will be released (e.g., for beta testing or for regular use). Applications are often binary files and are often referred to as "executables," "application files," and the like.

The released build product might exhibit some incorrect or unusual behavior. If this behavior can be re-created, then a developer can research and experiment with the problem and refine the build product if necessary. This process is often referred to as bug-fixing.

SUMMARY

A software developer uses the build automation tools and compiler/interpreter of an integrated development environment (IDE) to create a "build product." A build product is generally a binary file that contains a software application in executable form. A particular build process generates a particular application (build product) and a particular symbol table and is associated with a particular globally-unique identifier (GUID). The GUID of the particular build is included in the generated application and in the generated symbol table. This GUID "ties" a particular application to a particular symbol table and indicates that the application and the symbol table were generated from the same build process. A symbol table includes pairs of memory locations (e.g., hexadecimal numbers) and function names (from source code).

The IDE is enhanced so that the IDE is able to archive a build product. In one embodiment, a build product archive includes a manifest, a source code snapshot, a symbol table, and a build product. The manifest contains meta-data about the archive. The source code snapshot is a copy of the source code that was used in the build process. The symbol table is a copy of the symbol table that was generated by the build process. The build product is a copy of the build product that was generated by the build process.

The IDE is enhanced so that the IDE is able to work with an archived build product in various ways. For example, a developer can use the IDE to help share a build product with others. As another example, a developer can use the IDE to understand system logs and reports that describe operation of the build product (e.g., crash logs and memory logs).

BRIEF DESCRIPTION OF DRAWINGS

The disclosed embodiments have other advantages and features which will be more readily apparent from the detailed description and the accompanying figures (or drawings). A brief introduction of the figures is below.

DETAILED DESCRIPTION

Figure 1:
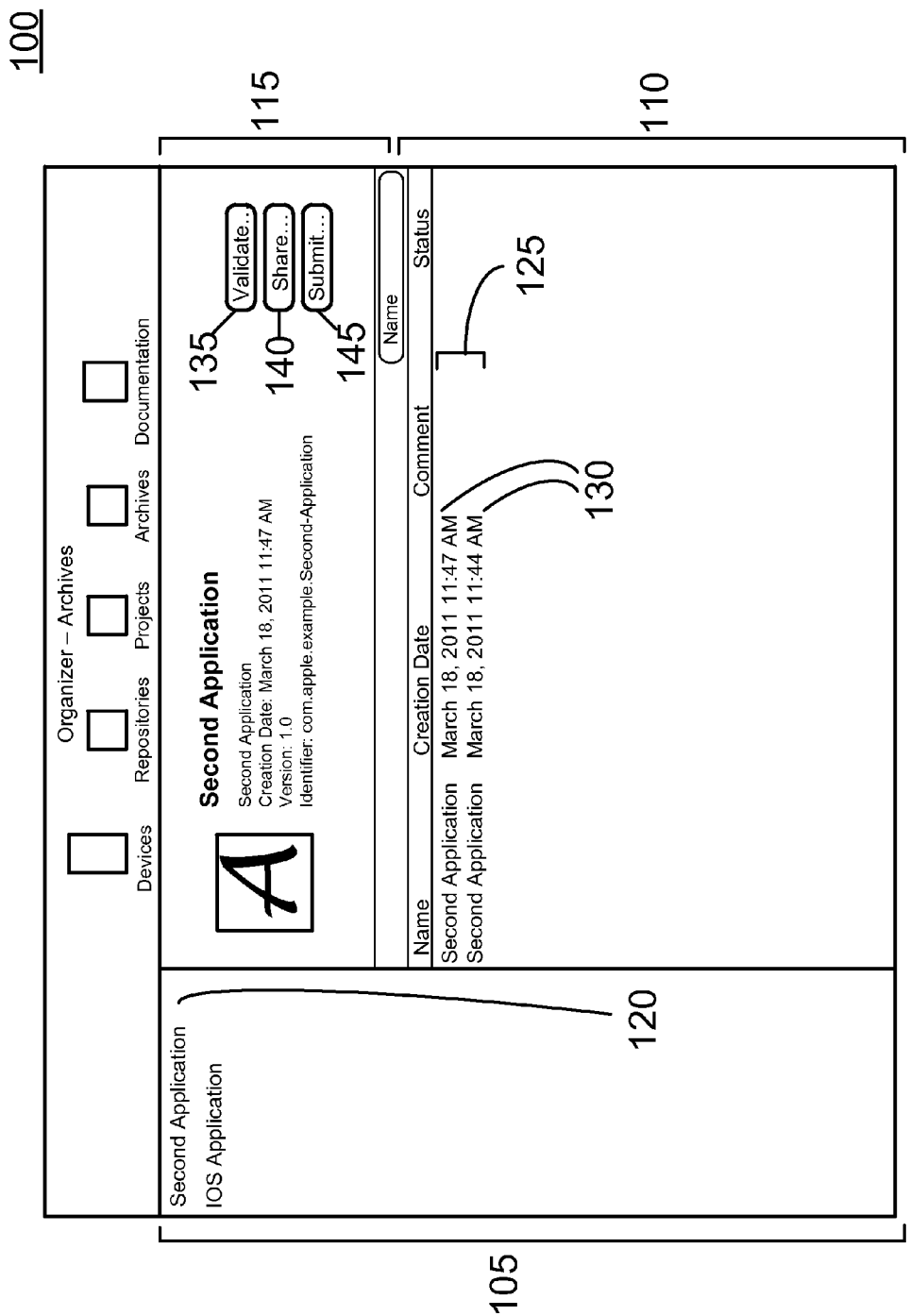
FIG. 1 illustrates a graphical user interface (GUI) for an integrated development environment (IDE) that is able to archive a build product, according to one embodiment of the invention.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

The figures and the following description relate to embodiments of the invention by way of illustration only. Alternative embodiments of the structures and methods disclosed here may be employed without departing from the principles of what is claimed.

Reference will now be made in detail to several embodiments, examples of which are illustrated in the accompanying figures. Wherever practicable, similar or like reference numbers may be used in the figures and may indicate similar or like functionality. The figures depict embodiments of the disclosed systems (or methods) for purposes of illustration only. One skilled in the art will readily recognize from the following description that alternative embodiments of the structures and methods illustrated herein may be employed without departing from the principles described herein.

Computer programmers frequently develop software applications using integrated development environments (IDEs). An IDE is a software application that usually includes a source code editor, a compiler and/or an interpreter, build automation tools, and a debugger. Examples of IDEs include XCODE IDE from Apple Inc. of Cupertino, Calif., and the VISUAL STUDIO IDE from Microsoft Corp. of Redmond, Wash. Other IDEs are known to those of skill in the art.

As described above, a released build product might exhibit some incorrect or unusual behavior. If the build product was archived prior to release, then this behavior can be re-created using the archived build product.

Also, the released build product might be "signed" with a certificate or a profile (e.g., a provisioning profile). A provisioning profile associates one or more development certificates, devices, and an iPhone application ID (a unique identifier for the iPhone applications a developer develops under an iPhone Developer Program contract). If the build product was archived prior to being signed with a provisioning profile, then the same archived build product can be used as the basis of two different signed build products (e.g., a first build product signed using a first provisioning profile and a second build product signed using a second provisioning profile). Provisioning profiles help support security (e.g., authentication and entitlements) and are further discussed in U.S. application Ser. No. 12/397,757, filed Mar. 4, 2009, entitled "Managing Code Entitlements for Software Developers in Secure Operating Environments" (U.S. Publication No. 2009-0249071) and U.S. application Ser. No. 12/398,001, filed Mar. 4, 2009, entitled "System and Method of Authorizing Execution of Software Code Based on at Least One Installed Profile" (U.S. Publication No. 2009-0249065), which are incorporated by reference.

In one embodiment, an IDE is enhanced so that the ME is able to archive a build product and/or work with the archived build product in various ways. The following user scenario demonstrates how such an enhanced IDE might be used. Technical details will be discussed after the user scenario.

Figure 6:
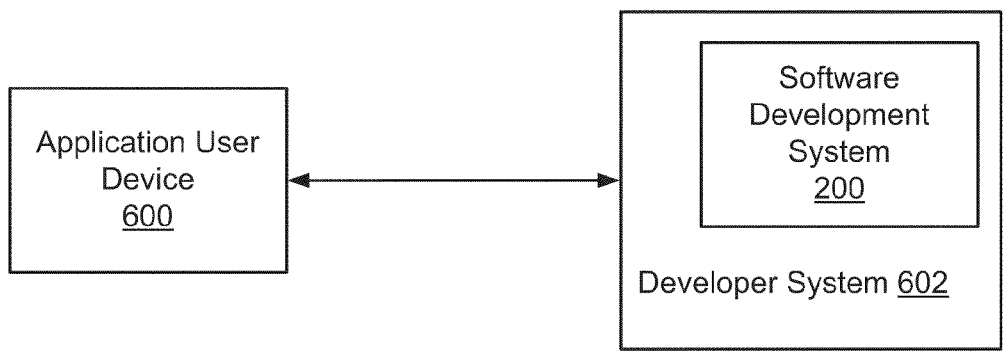
FIG. 6 is a block diagram illustrating a developer system in communication with an application user's device in accordance with an embodiment of the present invention.

A software developer uses a developer system 602 (FIG. 6) that includes a software development system 200 (FIGS. 2 and 6) to create a software application by writing source code and using an build automation tools and compiler/interpreter to create a "build product." A build product is generally a binary file that contains a software application executable form.

Create Archive

The developer wants to have an archive of the build product. The developer commands an enhanced IDE to archive the build product. For example, the developer inputs a command called "Build and Archive" and indicates the relevant software application (i.e., the application that the developer is creating). In response to receiving this command, the enhanced IDE creates both a build product (e.g., the executable application file) and an archive of the build product.

A graphical user interface (GUI) of the IDE is updated to reflect the existence of the newly created archive. For example, the GUI includes an "archives organizer" that displays a description of the newly created archive. FIG. 1 illustrates a GUI for an IDE that is able to archive a build product, according to one embodiment of the invention. The GUI 100 includes three panes: a build products pane 105, an archived build products pane 110, and a detail pane 115.

FIG. 1, the build products pane 105 includes two items: "Second Application" 120 and "iOS Application". Each of these items represents one build product. In the Second Application item 120, the name is preceded by an icon of a ruler, a pencil, and a pen as seen through an X-ray. The ruler shape, pencil shape, and pen shape combine to make the letter "A" for "application." This icon will be used to represent a Second Application build product. In the iOS Application item, the name is preceded by an icon of a hammer on top of a blueprint. This icon will be used to represent an iOS Application build product. Note that these icons and names are merely examples.

Since the Second Application item 120 has been chosen, the archived build products pane 110 displays a list 125 of archived build products ("archives") associated with the Second Application build product. In the list 125 of archives, each archive entry 130 includes information about the archive, such as when the archive was created and the name of the associated build product. Two archive entries 130 are shown in FIG. 1.

Since the first archive entry (Mar. 18, 2011 11:47 AM) has been chosen, the detail view 115 displays information regarding the first archive entry. Specifically, the detail view 115 displays the name of the associated build product (Second Application), the bundle identifier of the associated build product (com.apple.example.Second-Application), the version of the associated build product (1.0), when the archive was created (Mar. 18, 2011 11:47 AM), and the icon of the associated build product (a ruler, a pencil, and a pen).

In one embodiment, it is possible to have different user-visible names for the same application (build product). In this embodiment, what uniquely identifies the application is the bundle identifier. Consider a developer creating a new release of his product "My App" that he wants to rename to "My App Pro" but wants to keep the same bundle identifier to migrate user data when his users install the update. In FIG. 1, the detail view 115 displays the phrase "Second Application" twice—once in a larger font and once in a smaller font. In one embodiment, the phrase in the larger font is the name of the most recent build product and is identical to the name in the build products pane 105, and the phrase in the smaller font is the name of the currently selected build product in the archived build products pane 110.

Share Application

Now that an archive has been created, the developer can work with the archive in various ways. For example, the developer can share the application with others. In various embodiments, the developer can electronically sign the application using a digital certificate. In various embodiments, the application package includes a provisioning profile specifying access provisions related to the application (e.g., which physical devices are permitted to execute the application and the application's access to device features). In various embodiments, a device will not execute an application if a provisioning profile is not included and/or the application package is not signed.

In FIG. 1, the detail view 115 includes three buttons that help the developer share the application: the "Validate . . . " button 135, the "Share . . . " button 140, and the "Submit . . . " button 145. In one embodiment, the developer wants to share the application with a particular (known) device or set of devices 600 (illustrated generally as a single device in FIG. 6). The developer commands the enhanced IDE to create an appropriate signed build product (e.g., a build product that has been signed with the known device(s) provisioning profile). For example, the developer activates the Share button 140 and indicates the appropriate provisioning profile. In response to receiving this command, the enhanced IDE signs a build product with the provisioning profile that was indicated by the developer.

The signed build product can then be shared with the designated device(s). In one embodiment, the developer can indicate (in the GUI) whether to email the signed build product or save the signed build product to disk. The developer is then presented with a draft email (with the signed build product attached) or a "save" dialog, as appropriate.

In another embodiment, the developer wants to eventually release the application to the public (e.g., via a publicly-accessible application "store"). However, the developer is not yet ready to send the application to the store. The developer commands the enhanced IDE to create an appropriate signed build product (e.g., a build product that has been signed with a distribution provisioning profile) and validate the application (e.g., analyze the application and perform some tests to determine whether the application is ready to send to the store). For example, the developer activates the Validate button 135 and indicates the appropriate provisioning profile. In response to receiving this command, the enhanced IDE signs a build product with the provisioning profile that was indicated by the developer. The enhanced IDE then analyzes the signed build product and performs some tests to determine whether the signed build product is ready to send to the store.

In yet another embodiment, the developer is ready to release the application to the public (e.g., via a publicly-accessible application "store"). The developer commands the enhanced IDE to create an appropriate signed build product a build product that has been signed with a distribution provisioning profile) and send the application to the store. For example, the developer activates the Submit button 145 and indicates the appropriate provisioning profile. In response to receiving this command, the enhanced IDE signs a build product with the provisioning profile that was indicated by the developer. The enhanced IDE then sends the signed build product to the store.

In one embodiment, the developer is presented with a login dialog to the store. The developer enters meta-data into a web browser that will be used to list the application (signed build product) in the store. In another embodiment, the application is validated (e.g., analyzed and subjected to testing) before it is sent to the store. This validation is similar to the validation performed based on activation of the Validate button 135.

Debug Application

The developer can also work with the archive in another way. For example, the developer can use the archive to understand system logs and reports that describe operation of the application (e.g., crash logs and memory logs). As described above, a build product might exhibit some incorrect or unusual behavior. This behavior is frequently captured in a crash log. A crash log describes the state of the application when the application crashed (e.g., the execution path through the source code and stack traces) and is helpful to developers who are trying to debug the application. However, a crash log is difficult to understand, since it includes memory address offsets (e.g., hexadecimal numbers) rather than source code function names. An enhanced IDE can help the developer understand the crash log.

The developer receives a crash log (e.g., from a beta tester or other user). The developer wants to understand the log so that he can debug the application. The developer commands an enhanced IDE to interpret the log. The enhanced IDE "translates" the memory address offsets to source code function names and displays the resulting log. The developer uses the resulting log to debug the application. The enhanced IDE also identifies the correct version of the application and the source code that the developer should use when debugging the application.

Figure 3:
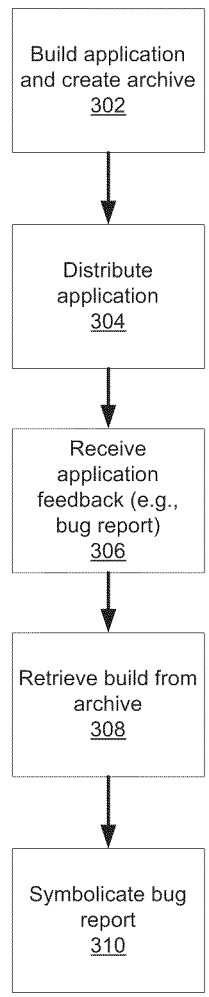
FIG. 3 is a flowchart of a method for creating, archiving, distributing, and debugging an application, according to one embodiment of the invention.

FIG. 3 is a flowchart of a method for creating, archiving, distributing, and debugging an application, according to one embodiment of the invention. In step 302, an application is built and an archive is created. For example, an enhanced IDE builds the application and archives the build product and related information. In step 304, the application is distributed to one or more users. For example, the enhanced IDE causes the application to be emailed or stored in an accessible network location. In step 306, application feedback (e.g., a bug report) is received. For example, the developer receives a crash log from a user of the application and loads the crash log into the enhanced IDE. In step 308, a build is retrieved from an archive. For example, the enhanced IDE retrieves the build that corresponds to the application whose operation is described in the bug report. In step 310, the bug report is symbolicated. For example, the enhanced IDE translates memory addresses in the crash log to function names that correspond to source code. Each of these steps is further described below.

Figure 2:
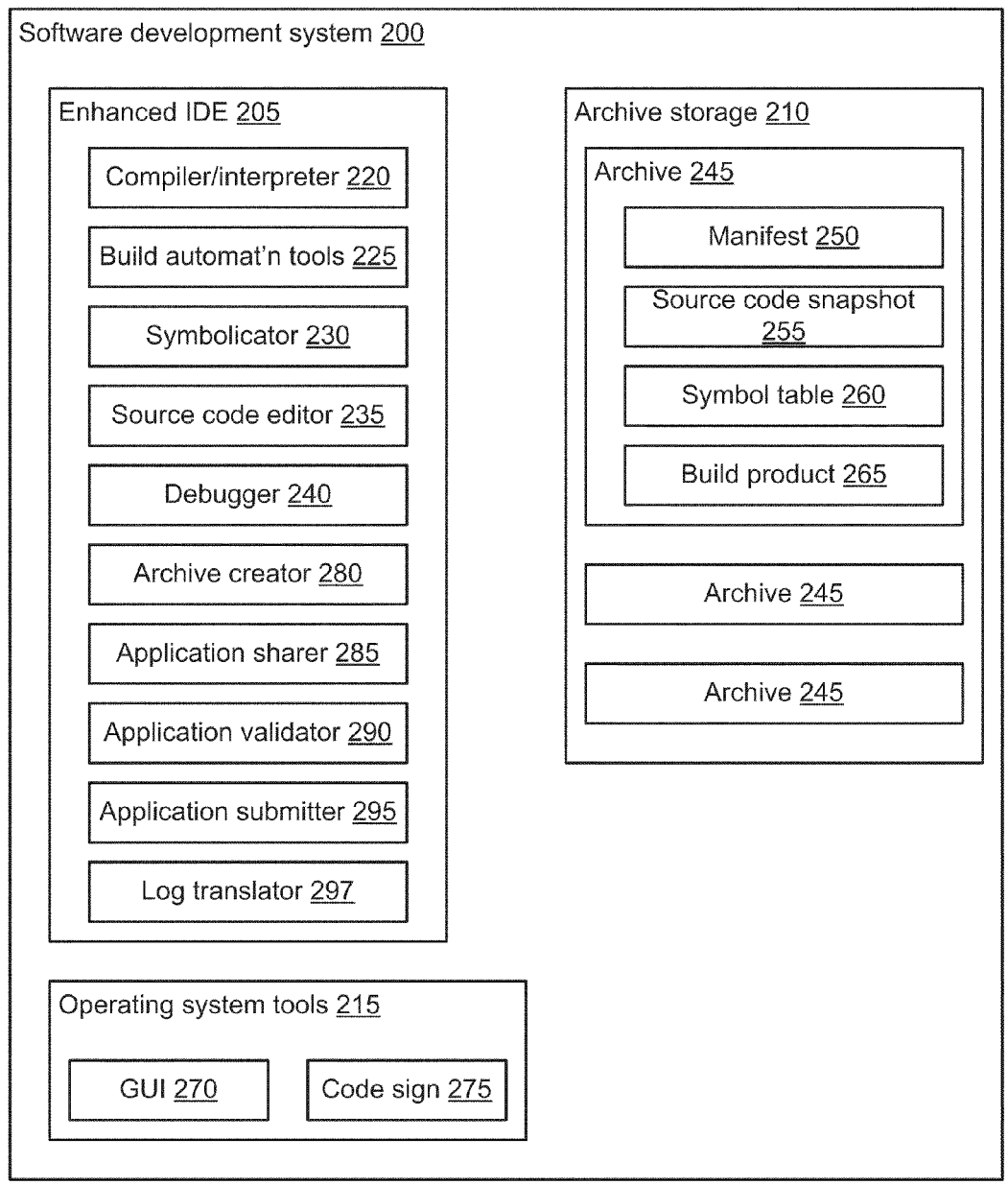
FIG. 2 is a block diagram of a software development system for archiving a build product, according to one embodiment of the invention.

FIG. 2 is a block diagram of a software development system for archiving a build product, according to one embodiment of the invention. The software development system 200 is able to archive a build product and work with the archive in various ways. The illustrated software development system 200 includes an enhanced integrated development environment (IDE) 205, archive storage 210, and operating system tools 215.

In one embodiment, the enhanced IDE 205 (and its component modules) and the operating system tools 215 are one or more computer program modules stored on one or more computer readable storage mediums and executing on one or more processors. The archive storage 210 (and its contents) is stored on one or more computer readable storage mediums. Additionally, the enhanced IDE 205 (and its component modules), the operating system tools 215, and the archive storage 210 (and its contents) are communicatively coupled to one another to at least the extent that data can be passed between them. In one embodiment, the operating system tools 215 are executing as one or more parts of an operating system on a personal computer and the enhanced IDE 205 is executing on the same personal computer.

The archive storage 210 stores archives 245. Although FIG. 2 shows the archive storage 210 storing three archives 245, any number of archives 245 can be stored. An archive 245 includes a manifest 250, a source code snapshot 255, a symbol table 260, and a build product 265. (Each of these items is described below in conjunction with the archive creator 280.) In one embodiment, each archive is stored in a different subdirectory so that the contents of the same archive can be easily identified.

The operating system tools 215 include a graphical user interface (GUI) 270 and code sign module 275. The GUI 270 outputs information to a user (e.g., using a display device) and receives information from a user using a pointing device and/or keyboard).

The code sign module 275 signs code in order to ensure the integrity of the code and the identity of its author and enables a system to recognize updated versions of the code as the same program as the original. Once code has been signed, any change in the code can be detected by the system. On the other hand, a signature on an updated version of a program tells the system to treat the new version exactly as it treated the old, so that users are not bothered with obscure dialogs asking them to give permission to the keychain or some other system component to interact with the code. Code signing technology was introduced in the APPLE MAC OS X v10.5 operating system.

The enhanced IDE 205 includes several modules. Some of the modules use conventional IDE technology, such as the compiler/interpreter 220, the build automation tools 225, the symbolicator 230, the source code editor 235, and the debugger 240. The compiler/interpreter 220 compiles/interprets source code. The build automation tools 225 build an executable application (using the compiler/interpreter 220) based on various files such as source code and libraries.

The symbolicator 230 interprets a system log (e.g., a crash log) given a particular symbol table 260. The symbol table 260 will be discussed below in conjunction with the archive creator 280. The system log will be discussed below in conjunction with the log translator 297.

The source code editor 235 enables a developer to edit source code. The debugger 240 enables a developer to debug source code.

Other modules in the enhanced IDE 205 include the archive creator 280, the application sharer 285, the application validator 290, the application submitter 295, and the log translator 297. Modules can be built in to the IDE or can be loaded in to the IDE separately (e.g., from a software development kit or "SDK").

Figure 4:
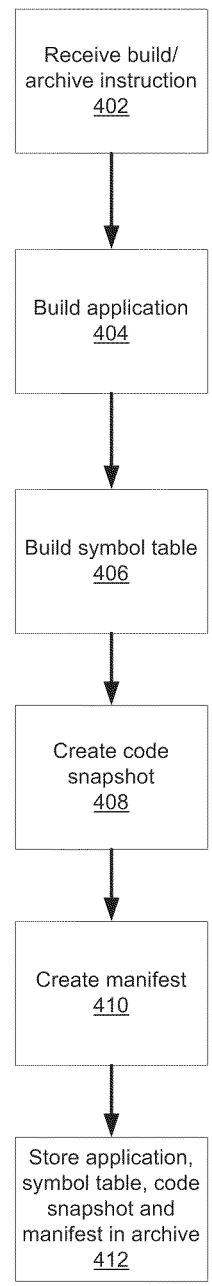
FIG. 4 is a flowchart of a method for archiving a build product, according to one embodiment of the invention.

The archive creator 280 archives a build product. FIG. 4 is a flowchart of a method for archiving a build product, according to one embodiment of the invention. In one embodiment, steps 402 to 412 are performed by the archive creator 280. In step 402, a build/archive instruction is received. For example, the instruction was generated when a developer commanded the enhanced IDE 205 to build and archive an application. In step 404, an application (build product) is built using the build automation tools 225. A build product is generally a binary file that contains a software application in executable form. A particular build process generates a particular application (build product) (step 404) and a particular symbol table 260 (step 406) and is associated with a particular globally-unique identifier (GUID). The GUID of the particular build is included in the generated application and in the generated symbol table 260. This GUID "ties" a particular application to a particular symbol table 260 and indicates that the application and the symbol table were generated from the same build process. A symbol table 260 includes pairs of memory locations (e.g., hexadecimal numbers) and function names (from source code).

In one embodiment, the application is a ".app" file and the symbol table 260 is a ".dSYM" file. A .app file contains an application that can be executed by one or more processors of a computer system, including a personal computer, APPLE IPHONE or APPLE IPAD, or other conventional device. A .dSYM file contains information that adheres to the DWARF debug information format. A .dSYM file can be used to symbolicate/interpret a crash log (discussed below in conjunction with the log translator 297). In another embodiment, the application is a ".exe" file and the symbol table 260 is a ".pdb" (program database) file.

After the application has been created, it is signed with development provisioning profile using the code sign module 275. The archive creator 280 then creates the archive 245 and stores it in the archive storage 210 (steps 408 to 412).

As introduced above, an archive 245 includes a manifest 250, a source code snapshot 255, a symbol table 260, and a build product 265. The manifest 250 is created by the archive creator 280 (step 410) and contains meta-data about the newly-created archive 245. Some of the meta-data in the manifest 250 is displayed in the GUI 100 in the detail view 115 (see FIG. 1). The meta-data can include, for example, the name of a file that contains icon graphics, a bundle identifier, a version number, an application file name, an application name, a date/time stamp indicating when the archive was created, an archive universally-unique identifier (UUID), and a profile UUID. The archive UUID uniquely identities the archive. The profile UUID uniquely identifies the development provisioning profile that was used to sign the build product. In one embodiment, the manifest 250 is a text file eXtended Markup Language (XML) format that adheres to the Property List (plist) Document Type Definition (DTD). Appendix A includes an example of a manifest 250.

The source code snapshot 255 is created by the archive creator 280 (step 408) and is a copy of the source code that was used in the build process. The symbol table 260 is a copy of the symbol table that was generated by the build process.

The build product 265 is a copy of the build product that was generated by the build process and signed with the development provisioning profile. The build product 265 can be used later on to generate applications for different provisioning profiles (via re-signing using the code sign module 275). The archive creator 280 stores the application (build product) 265, symbol table 260, source code snapshot 255, and the manifest 250 in the archive (step 412).

The application sharer 285 signs an application with a certificate that is specific to a particular user or set of users. For example, the application sharer 285 retrieves an application (build product) 265 from an archive 245. The retrieved application 265 has already been signed with a development provisioning profile. The application sharer 285 "un-signs" the application 265 (e.g., by removing the certificate information from the application file). The application sharer 285 then signs the unsigned application using the desired certificate (e.g., the provisioning profile that corresponds to the particular user or set of users) and the code sign module 275. In one embodiment, the application sharer 285 compresses the newly-signed application into a zip file. For example, the application sharer 285 creates a ".ipa" file that contains the newly-signed application.

The application validator 290 validates an application (e.g., analyzes the application and performs some tests to determine whether the application is ready to send to a publicly-accessible application "store").

The application submitter 295 validates an application (e.g., using the application validator 290) and then sends the application to an application "store."

Figure 5:
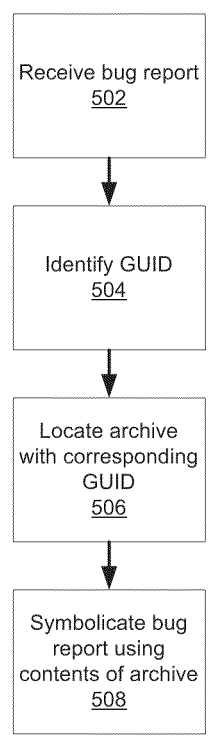
FIG. 5 is a flowchart of a method for interpreting a bug report, according to one embodiment of the invention.

The log translator 297 helps a developer understand bug reports. FIG. 5 is a flowchart of a method for interpreting a bug report, according to one embodiment of the invention. In one embodiment, the log translator 297 performs the steps of FIG. 5. In step 502, a bug report is received. For example, the enhanced IDE loads a crash log. The crash log describes operation of an application that has been archived. The crash tog includes pairs of memory address offsets (e.g., hexadecimal numbers and file names. The crash log includes a GUID that matches the GUID in an archived application 265 and symbol table 260. In step 504, the GUID within the bug report is identified. In step 506, an archive 245 is located that corresponds to the GUID in the bug report. For example, an operating system search utility is used to search for a symbol table that contains the GUID. In one embodiment, the GUID of the symbol table is present in a search index so that the search utility does not need to examine the contents of every symbol table (e.g., every .dSYM file). In step 508, the symbolicator is used to symbolicate the bug report using the contents of the archive. For example, the symbolicator translates the memory addresses in the crash log to source code function names using the archived symbol table. The enhanced IDE then displays the symbolicated (translated) bug report.

Reference in the specification to "one embodiment" or to "an embodiment" means that a particular feature, structure, or characteristic described in connection with the embodiments is included in at least one embodiment of the invention. The appearances of the phrase "in one embodiment" or "a preferred embodiment" in various places in the specification are not necessarily all referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms much as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs, EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the above description. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

APPENDIX A (EXAMPLE OF A MANIFEST)

```
<?xml version="1.0" encoding="UTF-8"?>
<!DOCTYPE plist PUBLIC "-//Apple//DTD PLIST 1.0//EN"
"http://www.apple.com/DTDs/PropertyList-1.0.dtd">
<plist version="1.0">
<dict>
    <key>CFBundleIconFile</key>
    <string>icon.png</string>
    <key>CFBundleIdentifier</key>
    <string>com.apple.Holdem</string>
    <key>CFBundleVersion</key>
    <string>1.0</string>
    <key>XCApplicationFilename</key>
    <string>JustMyCat.app</string>
    <key>XCApplicationName</key>
    <string>JustMyCat</string>
    <key>XCArchiveUUID</key>
    <string>C1411BF1-4BB3-476C-954F-991934297A3B</string>
    <key>XCArchivedDate</key>
    <real>290730375.58758801</real>
    <key>XCProfileUUID</key>
    <string>FA3BD413-370B-4EF0-AF25-597DD80C15F4</string>
</dict>
</plist>
```

What is claimed is:

1. A method for creating a software application archive, the method comprising:
receiving an instruction to create a build of a software application;
determining a globally unique identifier (GUID) associated with the software application;
building the software application;
building a symbol table based on the software application, wherein the symbol table includes pairs of memory locations and function names associated with the software application;
writing the GUID into each of the build of the software application and the build of the symbol table such that the GUID is included in both the build of the software application and the build of the symbol table; and
storing the build of the software application and the build of the symbol table in an archive on a computer readable storage medium.

2. The method of claim 1, wherein the archive further comprises source code that was used to create the build of the software application.

3. The method of claim 1, wherein the archive further comprises a manifest including meta-information about the build of the software application.

4. The method of claim 3, wherein the manifest includes at least one element of a group containing: a name of a file that contains icon graphics, a bundle identifier, a version number, an application file name, an application name, and a date/time stamp indicating when the archive was created.

5. The method of claim 3, wherein the meta-information includes a universally unique identifier (UUID).

6. The method of claim 1, further comprising:
receiving a crash report, wherein the crash report includes the GUID associated with the software application;
identifying, from among a plurality of archives and via the GUID, the stored archive that stores both the build of the software application and the build of the symbol table;
symbolicating the crash report according to the build of the symbol table; and
displaying the symbolicated crash report.

7. The method of claim 1, further comprising:
determining that the build of the software application is signed with a first provisioning profile;
retrieving the build of the software application from within the stored archive;
unsigning the retrieved build, thereby generating an unsigned build; and
signing the unsigned build with a second provisioning profile, thereby generating a signed build.

8. A computer program product stored on a non-transitory computer-readable medium and including instructions that, when loaded into memory, cause a processor to perform a set of operations, the set of operations comprising:
determining a globally unique identifier (GUID) associated with a software application that is to be built;
building the software application;
building a symbol table based on the software application, wherein the symbol table includes pairs of memory locations and function names associated with the software application;
writing the GUID into each of the build of the software application and the build of the symbol table; and
storing the build of the software application and the build of the symbol table in an archive on a computer readable storage medium.

9. The medium of claim 8, wherein the archive further comprises source code that was used to create the build of the software application.

10. The medium of claim 8, wherein the archive further comprises a manifest including meta-information about the build of the software application.

11. The medium of claim 10, wherein the manifest includes at least one element of a group containing: a name of a file that contains icon graphics, a bundle identifier, a version number, an application file name, an application name, and a date/time stamp indicating when the archive was created.

12. The medium of claim 10, wherein the meta-information includes a universally unique identifier (UUID).

13. The medium of claim 8, wherein the set of operations further comprises:
receiving a crash report, wherein the crash report includes the GUID associated with the software application;
identifying, from among a plurality of archives and via the GUID, the stored archive that stores both the build of the software application and the build of the symbol table;
symbolicating the crash report according to the build of the symbol table; and
displaying the symbolicated crash report.

14. The medium of claim 8, wherein the set of operations further comprises:
determining that the build of the software application is signed with a first provisioning profile;
retrieving the build of the software application from within the stored archive;
unsigning the retrieved build, thereby generating an unsigned build; and
signing the unsigned build with a second provisioning profile, thereby generating a signed build.

15. A system for creating a software application archive, comprising:
a processor; and
a memory storing instructions that, when executed by the processor, cause the processor to implement:
a software module adapted to receive an instruction to create a build of a software application;
an archive module adapted to:
determine a globally unique identifier (GUID) associated with the software application;
build the software application;
build a symbol table based on the software application, wherein the symbol table includes pairs of memory locations and function names associated with the software application;
write the GUID into each of the build of the software application and the build of the symbol table; and
store the build of the software application and the build of the symbol table in an archive on a computer readable storage medium; and
a storage module adapted to receive from the archive module the build of the software application and the build of the symbol table and to store the build of the software application and the build of the symbol table in an archive on a computer readable storage medium.

16. The system of claim 15, wherein the archive further comprises a manifest including meta-information about the build of the software application.

17. The system of claim 16, wherein the manifest includes at least one element of a group containing: a name of a file that contains icon graphics, a bundle identifier, a version number, an application file name, an application name, and a date/time stamp indicating when the archive was created.

18. The system of claim 16, wherein the meta-information includes a universally unique identifier (UUID).

19. The system of claim 15, wherein the archive module is further adapted to:
receive a crash report, wherein the crash report includes the GUID associated with the software application;
identify, from among a plurality of archives and via the GUID, the stored archive that stores both the build of the software application and the build of the symbol table;
symbolicate the crash report according to the build of the symbol table; and
display the symbolicated crash report.

20. The system of claim 15, wherein the archive module is further adapted to:
determine that the build of the software application is signed with a first provisioning profile;
retrieve the build of the software application from within the stored archive;
unsign the retrieved build, thereby generating an unsigned build; and
sign the unsigned build with a second provisioning profile, thereby generating a signed build.

* * * * *